United States Patent [19]

Martin, Jr.

[11] 4,279,587
[45] Jul. 21, 1981

[54] BLOW MOLDING MACHINE

[75] Inventor: Merritt W. Martin, Jr., Saline, Mich.

[73] Assignee: Roman Machine Co., Detroit, Mich.

[21] Appl. No.: 80,460

[22] Filed: Oct. 1, 1979

Related U.S. Application Data

[62] Division of Ser. No. 890,625, Mar. 20, 1978, Pat. No. 4,248,582.

[51] Int. Cl.³ .............................................. B29C 17/07
[52] U.S. Cl. ................................... 425/531; 264/542; 425/532; 425/534
[58] Field of Search ............... 425/531, 532, 534, 538, 425/539; 264/542, 543

[56] References Cited

U.S. PATENT DOCUMENTS

| | | | |
|---|---|---|---|
| 3,081,489 | 3/1963 | Jackson et al. | 425/531 |
| 3,239,879 | 3/1966 | Resnick | 425/532 X |
| 3,837,780 | 9/1974 | Strong | 425/532 X |
| 3,883,286 | 5/1975 | Kinslow, Jr. et al. | 425/451 X |
| 3,964,852 | 6/1976 | Marfiewicz | 425/541 |

*Primary Examiner*—Jan H. Silbaugh
*Attorney, Agent, or Firm*—Harness, Dickey & Pierce

[57] ABSTRACT

A blow molding machine for the manufacture of products such as bottles from a continuously extruded parison of plastic material. Two pairs of horizontally reciprocable mold sections alternately take a parison from a central station and transport it to either of two blow molding stations having vertically movable blow pins. The mold section platens carry laterally extending trimming elements and, when each pair of mold sections returns to retrieve another parison, the trimming elements trim flash from the molded product which hangs from the blow pin. The product is then transported to a delivery station by the trimming elements as the mold sections return to the blow molding station. The platens and blow pin stations are all supported by the vertically reciprocable table. As a knife severs the parison held by a pair of mold sections from the extruder and the mold sections start moving toward the mold station, the table lowers to prevent resticking of the material being continuously extruded. One of the platens has four tie bars secured thereto, all of which are below the level of the mold sections, the other ends of these bars carrying a force transfer plate. A reciprocable fluid motor is mounted between the other platen and said plate, the cylinder end of the motor being secured to the platen. A rack and pinion arrangement insures equal movement of the two mold sections.

4 Claims, 5 Drawing Figures

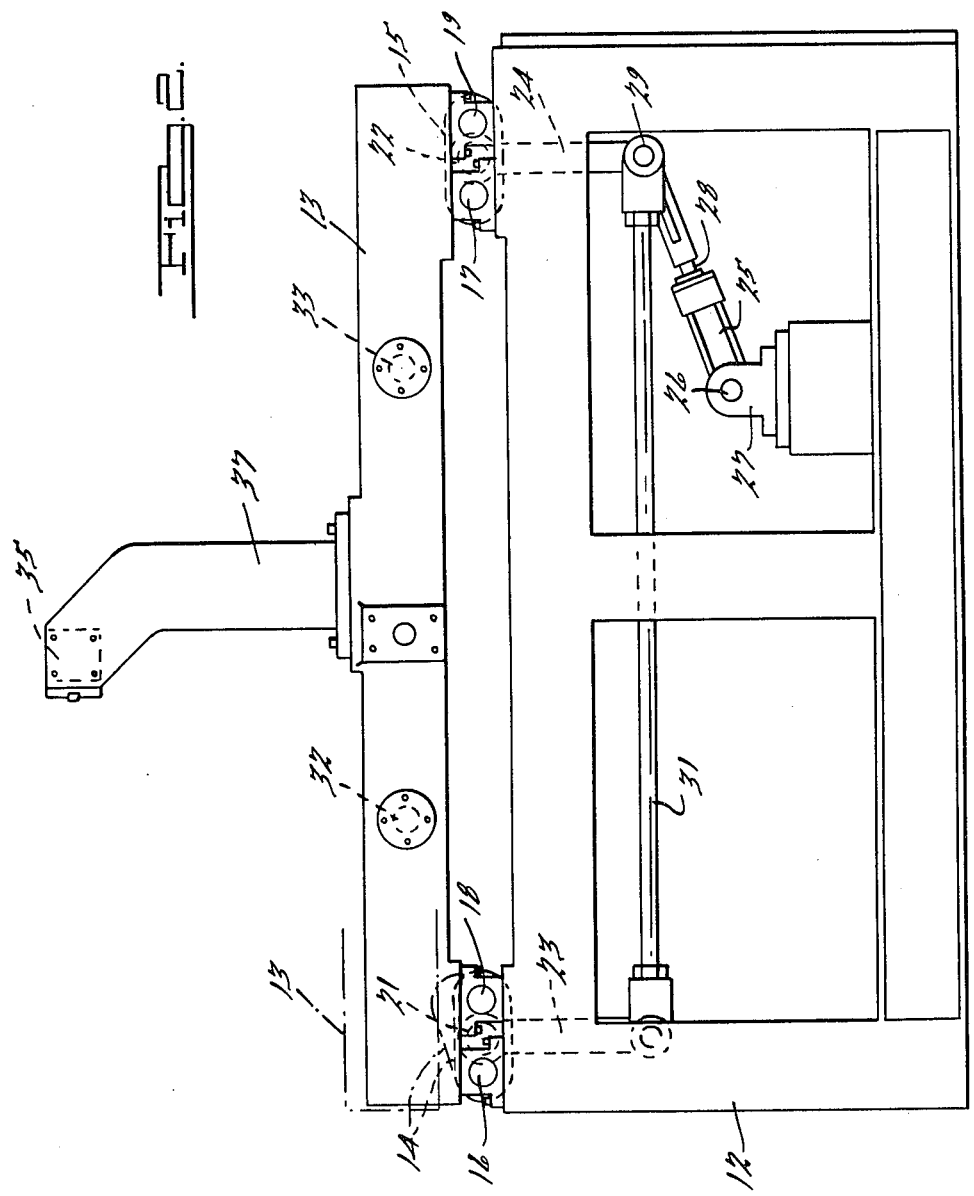

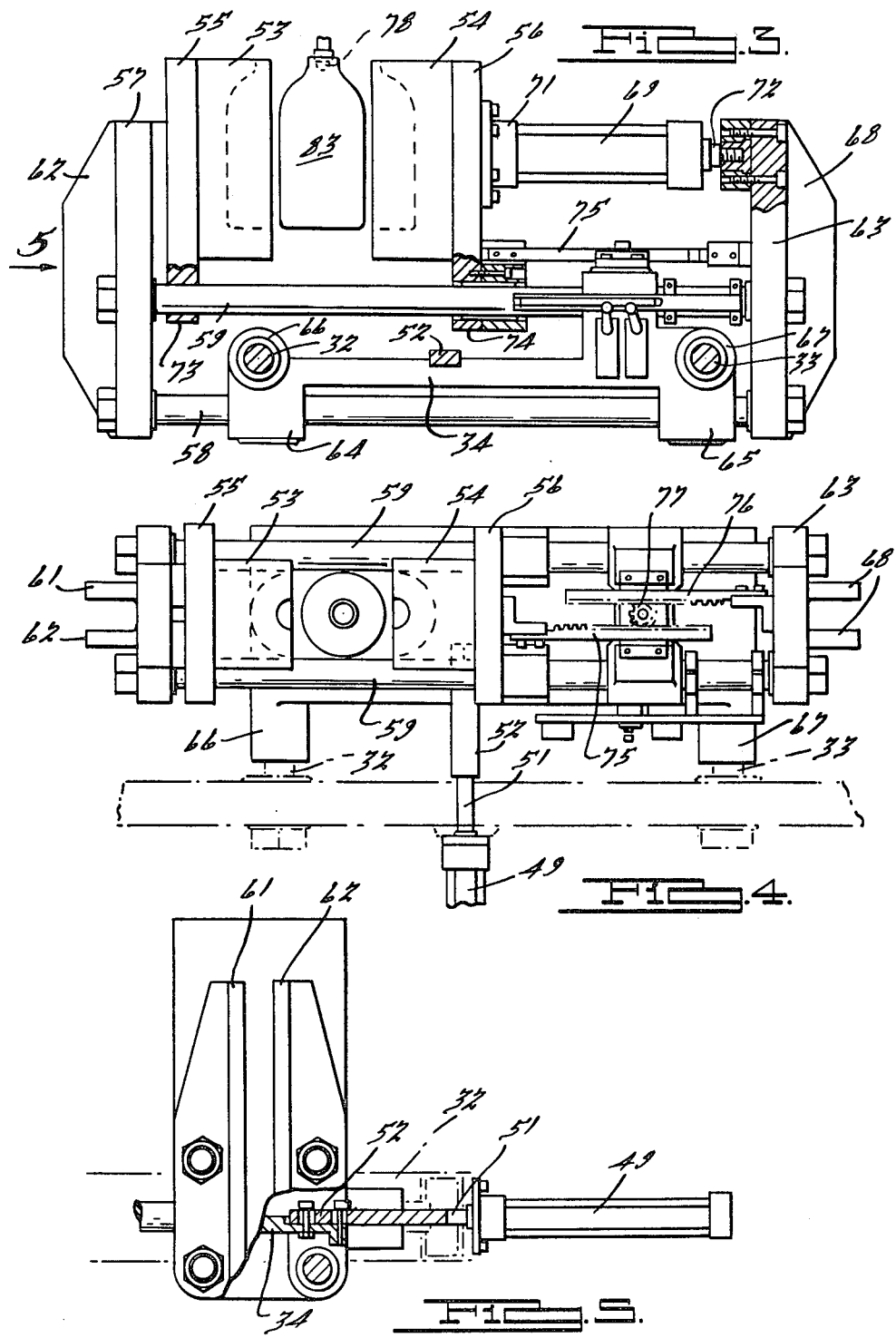

ns mounted on said table for transverse movement, means for moving said mold sections between clamped and unclamped positions, a blow pin mounted on said table and transversely spaced from said extruder at a blow molding station, means for moving said mold sections to said extruding station and moving the mold sections while at said extruding station to their clamped positions so as to engage a parison, means for simultaneously moving said table from its upper to its lower position, severing said parison with said severing means and moving said mold sections toward said blow molding station and means for thereafter raising said table, causing said blow pin to expand said parison in said mold sections, moving said mold sections to their unclamped positions and returning said mold sections to said extruding station.

BLOW MOLDING MACHINE

This is a division, of application Ser. No. 890,625, filed Mar. 20, 1978, now U.S. Pat. No. 4,248,582.

BACKGROUND OF THE INVENTION

1. Field of the Invention

The invention relates to blow molding machines, and more particularly to machines of the continuous extrusion type wherein a fixed extruder creates a continuous parison of plastic material, and mold sections transport this parison at cyclic intervals to one or more blow molding stations. The invention is concerned with the manner of separating each parison from the extrusion which follows it, actuation of the mold sections, and trimming of flash from the molded products.

2. Description of the Prior Art

It is known to have continuous extrusion blow molding machines as above described in which the mold sections reciprocate horizontally between the parison and the blow molding station. In these prior machines, in order to prevent the continuously forming parison from resticking, the extruder has been lifted as the mold sections start movement toward the blow molding station.

Prior actuating means for opening and closing the mold sections has included a U-shaped frame carrying independently actuatable reciprocating fluid motors on opposite sides thereof for the two platens which support the mold sections, these being connected by tie bars in the four corners of the sub-assembly. This prior construction has required considerable care in setting up in order to insure that the mold sections would be centered.

Prior product trimming arrangements have included a separate trimming station beyond the blow molding station at which the flash was removed. It is heretofore not been known to remove the flash, for example, at the neck and inside the hollow handle of a bottle, at the blow molding station itself.

BRIEF SUMMARY OF THE INVENTION

It is an object of the present invention to provide a novel and improved blow molding machine of the continuous extrusion type which includes means for preventing resticking of the parison taken by the mold sections, without the necessity of lifting the extruder.

It is another object to provide an improved blow molding machine of the above type which incorporates novel and effective means for actuating the mold sections between their clamped and unclamped positions, this means insuring centering of the mold sections in a stable manner and still permitting transfer between the parison and the blow molding stations.

It is a further object to provide a novel and improved blow molding machine having the above characteristics, which performs a flash trimming operation at the blow molding station, thus eliminating the necessity of transferring the product from this station, permitting it to cool, and providing extra trimming equipment.

Briefly, the blow molding machine of this invention comprises a base, an extruder mounted above said base at an extruding station and having means for continuously extruding a tubular parison, extruding parison severing means at said station, a table mounted on said base below said extruder for limited vertical movement between upper and lower positions, a pair of mold sec- In another aspect, the blow molding machine of this invention comprises a pair of mold sections, first and second platens supporting said mold sections, and means for actuating said mold sections between clamping and unclamping positions comprising a first force transfer plate secured to said first platen, a plurality of tie bars secured to and extending from said one force transfer plate, a second force transfer plate secured to the other ends of said tie bars, and a reciprocable fluid motor disposed between said second platen and said second force transfer plate.

In still another aspect, the blow molding machine of this invention comprises an extruding station having a continuous extruder for a tubular parison, a blow molding station to one side of said extruder, a pair of mold sections, means for moving said mold sections toward and away from each other between clamping and unclamping positions, means for moving said mold sections between said extruding and blow molding stations, and trimming elements mounted for movement with said mold sections, whereby movement of said mold sections to their clamping positions when at said extruding station will cause said trimming elements to trim a molded product at said blow molding station.

BRIEF DESCRIPTION OF THE DRAWINGS

FIG. 2 is a side elevational view of the base and movable table of the unit along with the bridge which supports the two blow molding stations;

FIG. 3 is a side elevational view of the mold section platen carriage, mold sections and associated parts including the actuating means for the mold sections, parts being sectioned for clarity;

FIG. 4 is a top plan view of the mechanism shown in FIG. 3; and

FIG. 5 is a fragmentary and partially sectioned view taken in the direction of the arrow 5 of FIG. 3 and showing one of the force transmitting plates as well as the actuating means for the platen carriage.

DESCRIPTION OF THE PREFERRED EMBODIMENT

Figure 1:
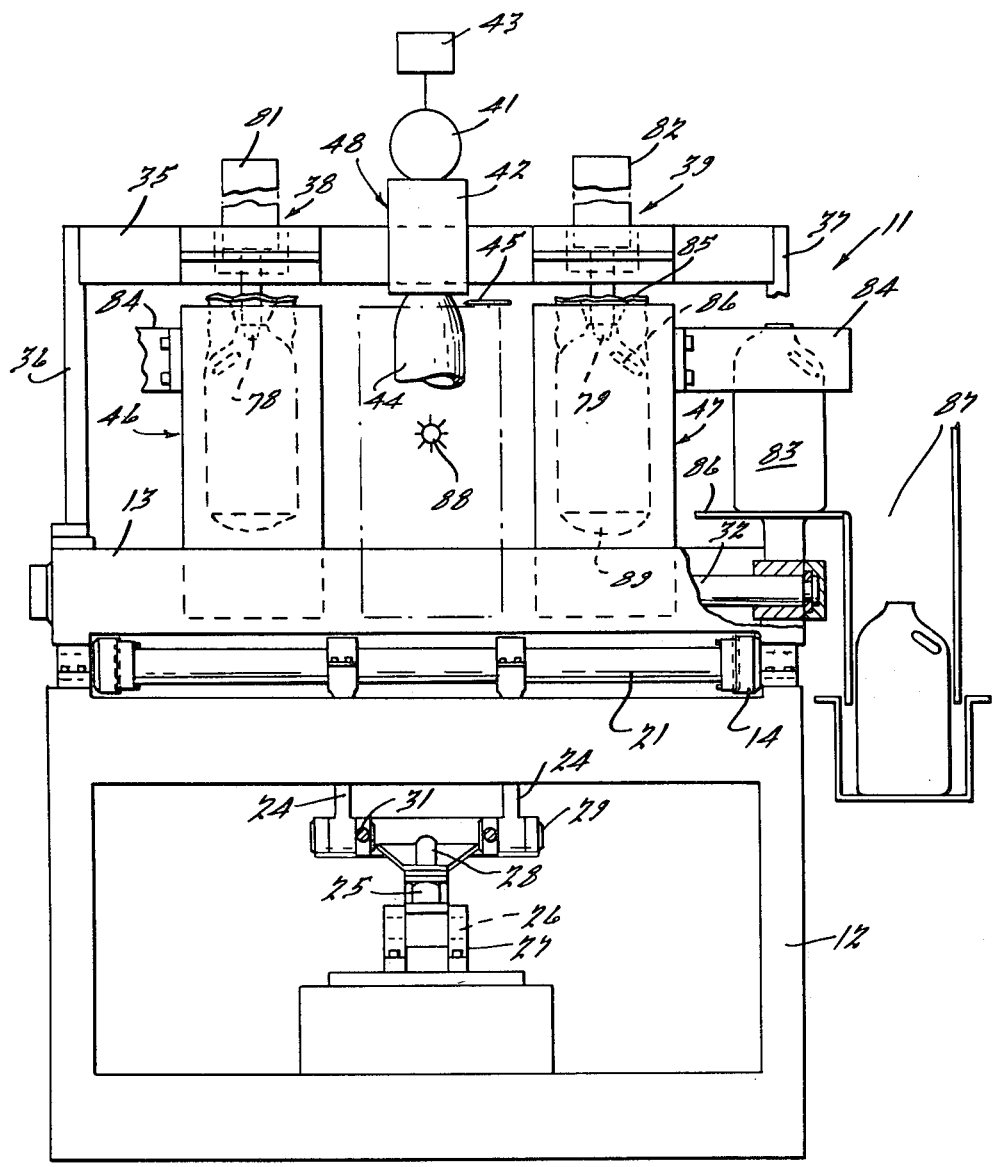
FIG. 1 is a partially schematic front elevational view of the blow molding machine of this invention showing the extruding and two blow molding stations, as well as a delivery platform and conveyor chute, parts being omitted and sectioned for clarity.

The machine is generally indicated at 11 in FIG. 1 and comprises a rectangular base or stand 12 on which is mounted a rectangular table 13. Four links arranged in two pairs 14 and 15 are pivoted at 16 and 17 respectively to the front and rear portions of the top of base 12. The other ends of these links are pivotally connected to the underside of table 13 at 18 and 19 respectively. A first torsion bar 21 extends between and is fixed to intermediate portions of links 14. A similar torsion bar 22 is fixed to intermediate portions of links 15. Pairs of crank arms 23 and 24 are secured respectively to intermediate portions of torsion bars 21 and 22 and extend downwardly therefrom. A reciprocable fluid motor 25 has one end pivotally secured at 26 to a fixed trunnion 27 within base 12, and a piston rod 28 connected to the lower ends of crank arms 24 by a crosspin 29. A pair of connecting rods 31 link pin 29 to the lower ends of crank arms 23.

The arrangement is such that table 13 is movable between a lower position as shown in solid lines in FIG. 1 and in a raised position as shown partially in dot-dash lines. In the lower position the table will rest on base 12 and links 14 and 15 will be horizontal. However, when piston rod 28 is extended, it will cause upward movement of torsion rods 21 and 22 and therefore upward swinging of links 14 and 15. This will cause the table to be raised to its dot-dash line position. Retraction of piston rod 28 will lower table 13. Because of the linkage arrangement, table 13 will have slight forward and rearward movement during its raising and lowering motions.

A pair of transfer bars 32 and 33 are mounted on table 13, extending laterally between the side members of the table. These transfer bars slidably support two independently movable platen carriages 34 as shown in FIG. 3. A bridge 35 is also mounted on the side members of table 13, this bridge being supported at its opposite ends by members 36 and 37. The bridge carries first and second blow molding stations generally indicated at 38 and 39 respectively, so that the blow molding stations as well as the mold section supporting carriage will move up and down as the table is raised and lowered.

An extruder schematically indicated at 41 is mounted in fixed position at the center of machine 11 above the bridge, this extruder having a head 42 and an extruder shut-off 43. Head 42 is capable of continuously extruding a tubular parison 44 of plastic material ready to be taken by a pair of mold elements as later described. Extruder 42 continuously extrudes this parison, and severing means such as a knife 45 is mounted adjacent the mouth of extruder 42 and is capable of moving in one direction or the other to cut off the extruded parison from that which is beginning to be extruded. Extruder 41 and its associated parts do not move up and down with bridge 35 or table 13.

Two independently movable pairs of mold sections, generally indicated at 46 and 47 respectively, are supported by the two carriages 34. Each pair of mold sections is movable between a parison pick-up position at the central extruding station 48 as shown in dot-dash lines in FIG. 1, and a position at one or the other of the blow molding stations 38 and 39. The means for moving each carriage 34 between its positions is shown partially in FIG. 5, comprising a reciprocable fluid motor 49 having a piston rod 51 secured at 52 to carriage 34.

Each pair of mold sections comprises first and second molds 53 and 54 secured to platens 55 and 56 respectively as seen in FIGS. 3 and 4. Platen 55 is secured to a first force transmitting plate 57 which extends downwardly therefrom, and two pairs of tie rods 58 and 59 are secured to the lower portions of this plate, which is reinforced by members 61 and 62 as seen in FIG. 5. A second force transmitting plate 63 is secured to the opposite ends of tie bars 58 and 59. Lower rods 58 pass through depending portions 64 and 65 of carriage 34, the carriage having upper portions which ride on transfer bars 32 and 33. Thus, when carriage 34 is reciprocated by motor 49 it will move the assembly comprising plates 57 and 63 together with their platens and mold sections.

Reinforcing elements 68 are provided for force transmitting member 63. The means for moving mold sections 53 and 54 between their clamping and unclamping positions comprises a reciprocable fluid motor 69, the cylinder head end 71 of which is secured to platen 56, while the piston rod end 72 is secured to the end of plate 63 remote from tie bars 58 and 59. Since the cylinder head end 71 of motor 69 is relatively wide it will give added stability to the movement of platen 56 and its mold element 54. Movement of force transmitting plate 63 will result in corresponding movement of platen 55 through tie bars 58 and 59. When motor 69 is being extended, rods 59 will be in tension and rods 58 in compression. The lower ends 73 and 74 of platens 55 and 56 respectively are mounted on tie rods 59, with ends 74 being slidably mounted for guidance purposes.

Means are provided for insuring that mold sections 53 and 54 have equal and opposite movements between their clamping and unclamping positions about the centers of the extruding and blow molding stations. This means includes racks 75 and 76 secured to platen 56 and force transmitting plate 63 respectively as seen in FIG. 4. A pinion 77 is disposed between and meshes with these racks. Movement of either mold section will thus be automatically and instantaneously followed by equal and opposite movement of the other section.

A blow pin 78 is provided at blow molding station 38 and a similar pin 79 at the other blow molding station. These pins are vertically reciprocable by fluid motors 81 and 82 respectively. After the blow molding has been completed and the pair of mold sections unclamped from the molded product 83, the product will remain hanging from the blow pin. Each pair of platens 55 and 56 is provided with a pair of trimming elements 84 which move to closed and open positions along with the platens. These trimming elements are capable of interfitting when in their closed position to remove the flash indicated at 85 which would normally be present on molded products such as a bottle 83 and also the flash 86 formed between the hollow handle and the main portion of the bottle. In previous constructions, trimming of these parts has been accomplished at a separate trimming station after transfer of the molded article. It has been found however that the trimming may be accomplished at the blow molding station in the manner described above. The juncture between the hot flashes 85 and 86 and their adjacent molded parts is initially cold and if the flash is forced off immediately this web or juncture may be broken. The length of each pair of trimming elements 84 is such that when its corresponding mold sections are at the extruding station the trimming elements will be at the blow molding station.

Means are also provided for receiving a trimmed product 83 delivered from the trimming element 84. This is in the form of a platform 86 outwardly of each blow molding station. A conveyor chute 87 is provided outwardly of platform 86 so that products will be received from the platform and transported to a packaging or other handling point.

In operation of machine 11, parison 44 will be continuously extruded and when the bottom or tail of the parison reaches a signal point such as an electric eye 88, one of the two pairs of mold sections 46 and 47 will be signalled to return to the extruding station and pick up the parison. In a typical installation, the chosen pair of mold sections will depend on the position of knife 45 so that the knife will cut against the gain. For example, if the knife is on the right hand side as shown in FIG. 1, the signal will call for the right hand pair of mold sections 47 since, when these mold sections return to blow molding station 39 with the parison, they will move against the direction of stroke of the knife.

When mold sections 47 are approaching the extruding station 48, they will be in their unclamped positions, and table 13 will be in its raised position. The mold sections will close around parison 44 and as knife 45 cuts the parison, motor 25 will cause table 13 to drop. Motor 49 will return the clamped mold sections and parison to blow molding station 39. It is preferable that the rate of descent of table 13 be greater than the extruding speed of parison 44 so that resticking will be prevented.

When the clamped mold sections reach blow molding station 39, table 13 will be raised. It should be pointed out that while mold sections 47 are traveling from station 48 to station 39, mold sections 46 will be at station 38 with a product being molded. Mold sections 46 and blow molding station 38 will thus drop and then rise together with mold sections 47, but this will have no effect on the operation at station 38. After the mold sections 47 have been raised, blow pin 79 will descend and enter the neck of the product, expanding the parison to form bottle 83. At the same time, mold sections 46 will be taking their parison, table 13 dropping and then arising as before. Mold sections 47 will next be unclamped by motor 69 and return to station 48 to pick up a new parison.

When mold sections 47 close on the new parison, their associated trimming elements 84 will close on the product hanging from the blow pin 79 to knock off flashes 85 and 86. The blow pin will be retracted upwardly, and the next movement of mold sections 47 from station 48 to station 39 will be accompanied by transport of the previously formed article by trimming elements 84 from station 39 to platform 86. Means (not shown) may be provided on platform 86 for removing tail 89 on the bottom of the product as the product approaches the platform. Trimming elements 84 could support the product for example by entering the space formerly occupied by flash 86. This cycle will be repeated on alternate sides of the machine, trimming elements 84 releasing the bottle when they are unclamped to rest on platform 86. Each time a bottle arrives at platform 86 it will push the bottle previously occupying this platform into conveying chute 87.

It should be observed that the mounting of blow pins 78 and 79 on table 13 so that they reciprocate vertically with their mold sections is of particular advantage in the double blow molding machine arrangement illustrated in the drawings. This is because either blow pin may continue to conduct its blow molding operation regardless of the vertical movement of its corresponding mold sections. This permits both pairs of mold sections 46 and 47 to be mounted on the common table 13 for lowering movement to prevent resticking.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A blow molding machine comprising a base, an extruder mounted above said base at an extruding station and having means for continuously extruding a tubular parison, extruding parison severing means at said station, a table mounted on said base below said extruder for limited vertical movement between upper and lower positions, a pair of mold sections mounted on said table for transverse movement, means for moving said mold sections between clamped and unclamped positions, a blow pin mounted on said table and transversely spaced from said extruder at a blow molding station, means for moving said mold sections to said extruding station and moving the mold sections while at said extruding station to their clamped positions so as to engage a parison, means for moving said table from its upper to its lower position, means for severing said parison with said severing means and means for moving said mold sections toward said blow molding station, simultaneously with said table movement, means for thereafter raising said table, means for causing said blow pin to expand said parison in said mold sections, means for moving said mold sections to their unclamped positions, means for returning said mold sections to said extruding station, said means for raising and lowering said table comprising two pairs of links at the opposite ends of said table, each pair of links having one end pivotally connected to said frame and the other end connected to said table, whereby said table will have slight forward and rearward movement during its raising and lowering motions, a pair of torsion bars secured between intermediate portions of each pair of links, two crank arms secured to said torsion bars, and reciprocating motor means connected to the outer ends of said crank arms.

2. The combination according to claim 1, said blow pin being mounted on a bridge above and secured to said table.

3. The combination according to claim 1, said motor means comprising a fluid motor pivotally connected to the outer end of one of said crank arms, and a link extending from said one crank arm to the outer end of the other crank arm.

4. The combination according to claim 1, said table having a plurality of transversely extending rails, said mold sections being mounted on a carriage riding on said rails, said means for moving the mold sections to said extruding station comprising a reciprocable fluid motor for said carriage.

* * * * *